(12) United States Patent
Kudo et al.

(10) Patent No.: US 9,591,200 B2
(45) Date of Patent: Mar. 7, 2017

(54) IMAGING APPARATUS AND ACCESSORY, AND METHOD AND SYSTEM OF THE SAME, AND MEDIUM

(71) Applicant: CANON KABUSHIKI KAISHA, Tokyo (JP)

(72) Inventors: Keisuke Kudo, Kawasaki (JP); Yoshihiko Aihara, Yokohama (JP); Minoru Uchiyama, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/590,518

(22) Filed: Jan. 6, 2015

(65) Prior Publication Data

US 2015/0109471 A1  Apr. 23, 2015

Related U.S. Application Data (63) Continuation of application No. 13/275,599, filed on Oct. 18, 2011, now Pat. No. 8,941,774.

(30) Foreign Application Priority Data

Oct. 27, 2010 (JP) ................................ 2010-241201
Aug. 9, 2011 (JP) ................................ 2011-173937

(51) Int. Cl.
*H04N 5/232* (2006.01)
*G03B 17/56* (2006.01)
*G03B 13/36* (2006.01)

(52) U.S. Cl.
CPC ......... *H04N 5/23209* (2013.01); *G03B 13/36* (2013.01); *G03B 17/565* (2013.01); *H04N 5/23212* (2013.01)

(58) Field of Classification Search
None
See application file for complete search history.

(56) References Cited

U.S. PATENT DOCUMENTS

| | | | | |
|---|---|---|---|---|
| 5,043,754 A | * | 8/1991 | Aihara .................. | G03B 17/14 396/129 |
| 2002/0127012 A1 | * | 9/2002 | Okawara ................ | G02B 7/102 396/81 |

(Continued)

FOREIGN PATENT DOCUMENTS

| | | |
|---|---|---|
| JP | H09-186925 A | 7/1997 |
| JP | H11-064956 A | 3/1999 |

(Continued)

*Primary Examiner* — Mark T Monk
(74) *Attorney, Agent, or Firm* — Canon USA, Inc. I.P. Division (57) ABSTRACT

An imaging apparatus to which an accessory is detachably attached includes an imaging unit configured to convert an object image into an electrical signal, a signal generation unit configured to generate a vertical synchronizing signal that is synchronized with a timing of exposure of the imaging unit and output the generated vertical synchronizing signal, a control unit configured to control communication with the accessory based on the vertical synchronizing signal, a first terminal configured to send a clock signal generated by the control unit to the accessory, and a second terminal configured to communicate data with the accessory based on the clock signal, in which the control unit controls a signal level at the first terminal to a predetermined level when the communication of the data ends, and then changes the signal level in synchronization with the output of the vertical synchronizing signal.

46 Claims, 6 Drawing Sheets

(56) References Cited

U.S. PATENT DOCUMENTS

| | | |
|---|---|---|
| 2006/0066747 A1 | 3/2006 | Tsuda |
| 2008/0100730 A1 | 5/2008 | Tsuda |
| 2009/0237552 A1* | 9/2009 | Yuba .................... G03B 13/18 348/349 |

FOREIGN PATENT DOCUMENTS

| | | |
|---|---|---|
| JP | 2005-037824 A | 2/2005 |
| JP | 2009-258558 A | 11/2009 |
| JP | 2009-258718 A | 11/2009 |

* cited by examiner

FIG. 5

IMAGING APPARATUS AND ACCESSORY, AND METHOD AND SYSTEM OF THE SAME, AND MEDIUM

CROSS REFERENCE TO RELATED APPLICATIONS

This application is a continuation application of U.S. patent application Ser. No. 13/275,599 filed Oct. 18, 2011, which claims priority from Japanese Patent Application No. 2010-241201 filed Oct. 27, 2010, and Japanese Patent Application No. 2011-173937 filed Aug. 9, 2011, which are hereby incorporated by reference herein in their entirety.

BACKGROUND OF THE INVENTION

1. Field of the Invention

The present invention relates to an imaging apparatus on which an accessory can be mounted and which can communicate with the accessory, and the accessory which can be mounted on the imaging apparatus.

2. Description of the Related Art

In recent years, in a lens interchangeable camera, a moving image capturing mode has begun to be added in addition to a still image capturing mode. The camera includes not only a type of observing an imaging object using an observation optical system including a reflex mirror but also a type of observing a captured image by displaying the image on a liquid crystal screen for a monitor.

Conventionally, as a system for detecting a focus during moving image capturing and during live view display, a wobbling system for slightly driving a focus lens back and forth (a wobbling operation) to detect a focus has been known in a video camera or the like. In the wobbling system, an automatic focus (AF) evaluation value is taken in while the focus lens is being slightly driven, to determine whether an object is currently in focus. Japanese Patent Application Laid-Open No. 9-284632 discusses a technique for bringing an object into focus using a wobbling system.

During moving image capturing and during preview display, actuators in an interchangeable lens are required to be continuously operated, for example, subjected to focusing and diaphragm driving. Therefore, it is important to control driving of the actuators while frequently monitoring states of the focus lens and a diaphragm. The monitoring of a state of the interchangeable lens and the driving control of each of the actuators are implemented by a communication function between the interchangeable lens and a camera body.

During preview display and during moving image capturing, information relating to the above-mentioned driving control is communicated between a lens microcomputer in the interchangeable lens and a camera microcomputer in the camera body for each frame. Therefore, necessary information is required to be timely communicated to the lens microcomputer and the camera microcomputer. As the camera and the interchangeable lens increase in performance, an amount of data to be communicated increases. Therefore, a communication performance is required to be improved. Japanese Patent Application Laid-Open No. 2009-258558 discusses a camera system including a plurality of communication systems. More specifically, it discusses performing communication using two types of communication systems, i.e., high-speed communication from a lens to a camera and low-speed communication from the camera to the lens during moving image capturing to increase communication efficiency.

During the wobbling operation, storage of charge and driving of the diaphragm for acquiring the AF evaluation value may be desirably performed while the driving of the focus lens is stopped. Because, when the storage of the charge and the driving of the diaphragm for acquiring the AF evaluation value are performed while the focus lens is being driven, the AF evaluation value varies, so that an accurate focusing result is not obtained. Therefore, the camera microcomputer is required to communicate a signal, which is synchronized with exposure of an image sensor, to the lens microcomputer to notify the lens microcomputer of a timing of the exposure of the image sensor in each frame. The camera microcomputer transmits such a signal to the lens microcomputer, so that the lens microcomputer can control a timing of the driving of the focus lens based on the timing of the exposure of the image sensor. As a result, the camera microcomputer can drive the diaphragm and acquire the AF evaluation value while the driving of the focus lens is stopped. However, in the conventional technique, a dedicated signal line is required between the camera and the lens to communicate the signal to the lens microcomputer, leading to an increase in the number of contacts.

SUMMARY OF THE INVENTION

The present invention is directed to enabling communication to notify a timing of exposure of an image sensor to a lens without requiring a contact dedicated to notify a signal that is synchronized with the exposure of the image sensor.

According to an aspect of the present invention, an imaging apparatus to which an accessory is detachably attached includes an imaging unit configured to convert an object image into an electrical signal, a signal generation unit configured to generate a vertical synchronizing signal that is synchronized with a timing of exposure of the imaging unit and output the generated vertical synchronizing signal, a control unit configured to control communication with the mounted accessory based on the vertical synchronizing signal, a first terminal configured to send a clock signal generated by the control unit to the accessory, and a second terminal configured to communicate data with the accessory based on the clock signal, in which the control unit controls a signal level at the first terminal to a predetermined level when the communication of the data ends, and then changes the signal level in synchronization with the output of the vertical synchronizing signal.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

A first exemplary embodiment will be described. In the present exemplary embodiment, a camera capable of live view shooting and being lens interchangeable will be described as an example.

Figure 1:
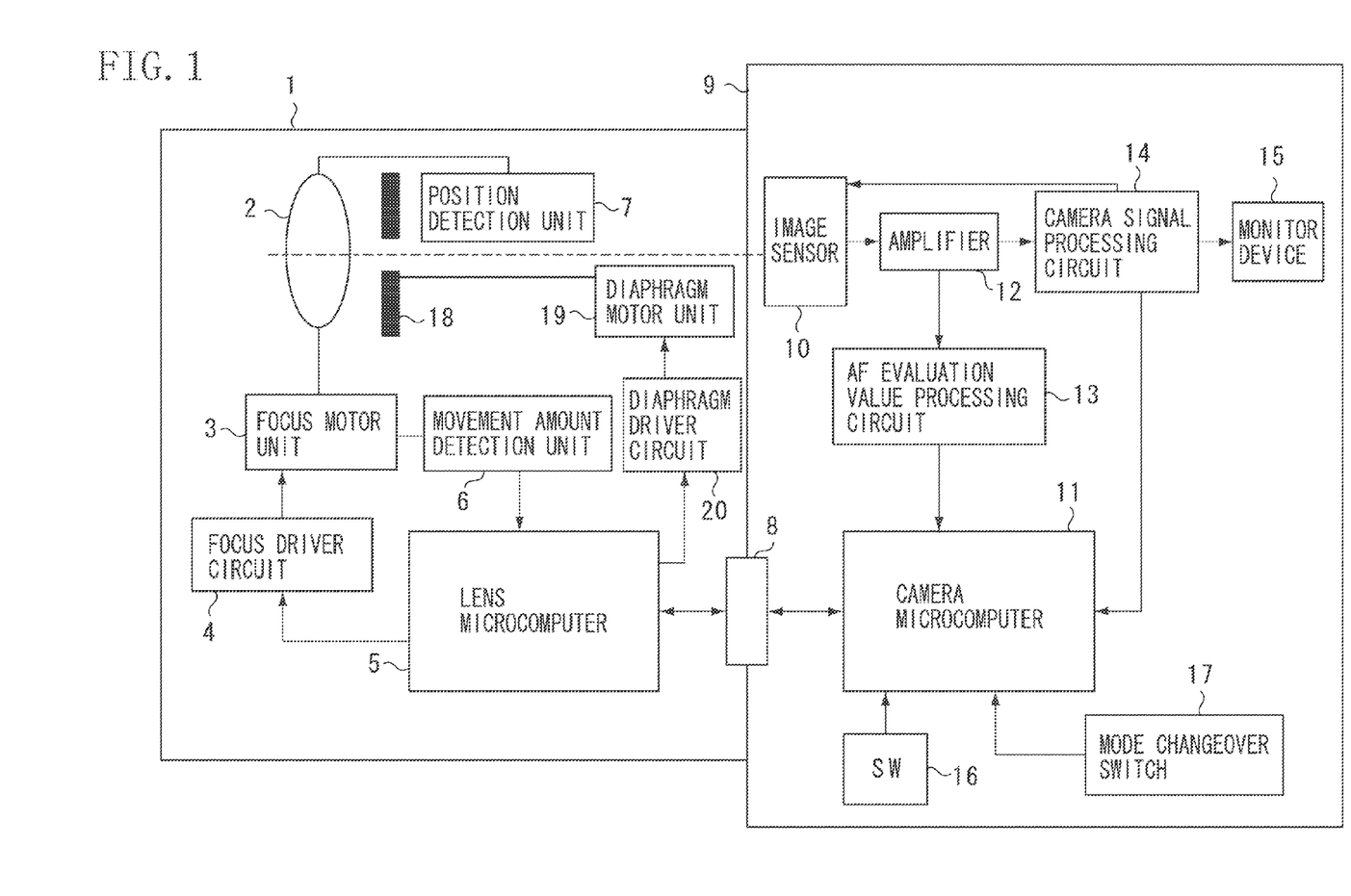
FIG. 1 is a block diagram of a camera and an interchangeable lens.

A system configuration of a camera and a lens will be described. FIG. 1 is a block diagram of an interchangeable lens 1 serving as an accessory and a camera body 9. The interchangeable lens 1 is detachably attached to the camera body 9. A focus lens 2 serving as an optical member moves in an optical axis direction, so that an object can be brought into focus. A focus motor unit 3 includes a focus motor for moving the focus lens 2 and a plurality of gear trains serving as its speed reduction mechanism. A focus driver circuit 4 drives the focus motor in the focus motor unit 3.

A diaphragm 18 adjusts the amount of light incident on an image sensor 10. A diaphragm motor unit 19 includes a diaphragm motor for driving the diaphragm 18 and a plurality of gear trains serving as a speed reduction mechanism of the diaphragm motor. A diaphragm driver circuit 20 drives the diaphragm motor unit 19. A lens microcomputer 5 that controls the interchangeable lens 1 includes a serial communication unit for communicating with the camera body 9, a timer function, a digital-to-analog conversion (DAC) function, an input/output port, and memory functions such as a read-only memory (ROM) and a random access memory (RAM). A movement amount detection unit 6 includes a small disk that rotates in synchronization with rotation of the focus motor, and a photo interrupter element, and detects an amount of rotation of the focus motor. The disk is notched at a substantially equal pitch on its circumference.

The lens microcomputer 5 controls the focus motor based on a detection result from the movement amount detection unit 6. The lens microcomputer 5 measures a time interval for each pitch of a signal from the photo interrupter element, and detects speeds of the focus motor and the focus lens 2.

A position detection unit 7 detects at which position from an infinity distance to a closest distance the focus lens 2 exists.

A configuration of the camera body 9 will be described below. A camera microcomputer 11 that controls the camera body 9 includes a serial communication unit for communicating with the lens microcomputer 5, a timer function, a DAC function, an input/output port, and memory functions such as a ROM and a RAM. An image sensor 10 includes a complementary metal-oxide semiconductor (CMOS) sensor for photoelectrically converting light that has passed through a lens serving as an optical system into a signal. An amplifier 12 electrically amplifies the signal after the photoelectric conversion by the image sensor 10. A camera signal processing circuit 14 subjects an output signal from the amplifier 12 to various types of image processing, to generate a video signal.

The camera signal processing circuit 14 generates a vertical synchronizing signal that is synchronized with a timing of exposure to the image sensor 10, and outputs the generated vertical synchronizing signal to the camera microcomputer 11. A monitor device 15 includes a liquid crystal display (LCD), and displays a video signal from the camera signal processing circuit 14. An AF evaluation value processing circuit 13 generates an AF evaluation value for focus evaluation from the output signal of the amplifier 12. The AF evaluation value processing circuit 13 includes a gate circuit and a filter for sampling only a predetermined portion of the video signal to generate the AF evaluation value. The camera microcomputer 11 makes focus adjustment and controls a time of exposure of the image sensor 10 based on an output signal of the AF evaluation value processing circuit 13.

A release switch 16 is a switch for instructing to focus and release the camera by a user of the camera body 9. The release switch 16 is configured in two stages to instruct to focus the camera by half press (SW1) and to shoot by full press (SW2). A mode changeover switch (selection unit) 17 is a switch for selecting one of a still image capturing mode and a moving image capturing mode as an image capturing mode of the camera body 9.

A contact unit 8 is used to perform communication between the camera microcomputer 11 and the lens microcomputer 5. The contact unit 8 includes a plurality of metal protrusions on the side of the camera body 9, and includes a plurality of metal pieces embedded therein to come into contact with the protrusions on the side of the interchangeable lens 1. When the interchangeable lens 1 is mounted on the camera body 9, the camera microcomputer 11 and the lens microcomputer 5 are electrically connected to communicate with each other.

Figure 2:
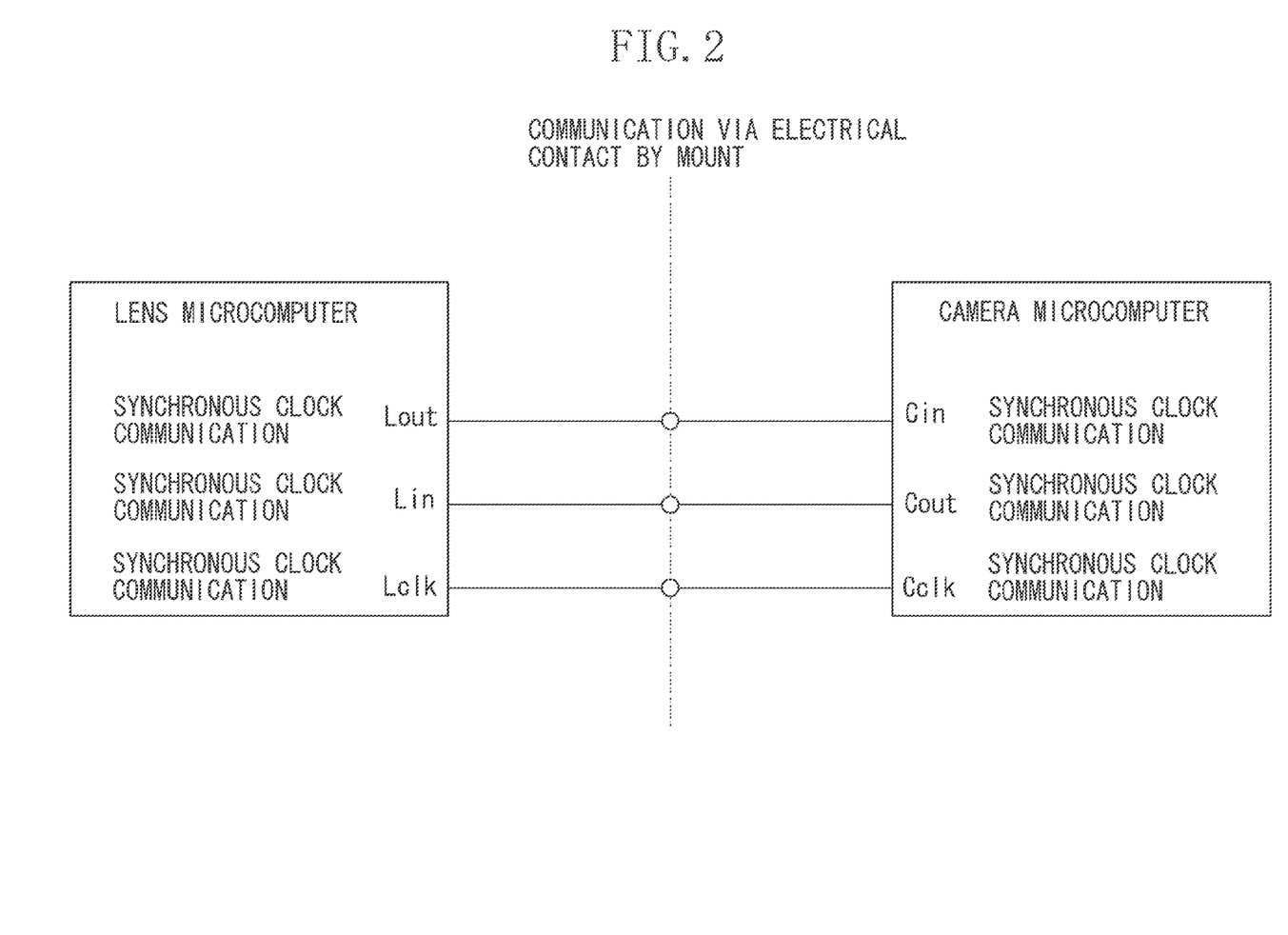
FIG. 2 illustrates a contact unit between a camera and an interchangeable lens.

FIG. 2 schematically illustrates a contact unit between the camera body 9 and the interchangeable lens 1. FIG. 2 illustrates communication terminals of the lens microcomputer 5 on its left side and communication terminals of the camera microcomputer 11 on its right side. The contact unit 8 illustrated in FIG. 1 connects the camera microcomputer 11 and the lens microcomputer 5. In the lens microcomputer 5, the communication terminal Lout is an output terminal of data from the lens microcomputer 5 by synchronous clock communication, the communication terminal Lin is an input terminal of data from the camera microcomputer 11 by synchronous clock communication, and the communication terminal Lclk is an input/output terminal of a synchronous clock signal by synchronous clock communication.

On the other hand, in the camera microcomputer 11, the communication terminal Cin is an input terminal of data from the lens microcomputer 5 by synchronous clock communication, the communication terminal Cout is an output terminal of data from the camera microcomputer 11 by synchronous clock communication, and the communication terminal Cclk is an input/output terminal of a synchronous clock signal by synchronous clock communication. A feature of the synchronous clock communication is basically synchronous communication using a reference clock, so that a communication clock rate can be relatively increased. In the present exemplary embodiment, description is made for an case where a communication system using only clock synchronization is used.

Communication during a wobbling operation will be described. A communication system between the camera and the interchangeable lens 1, which is a subject matter of the present invention, will be described below. In the present exemplary embodiment, suppose a case where a still image is captured or a case where a moving image is captured while the monitor device 15 performs preview display.

Figure 5:
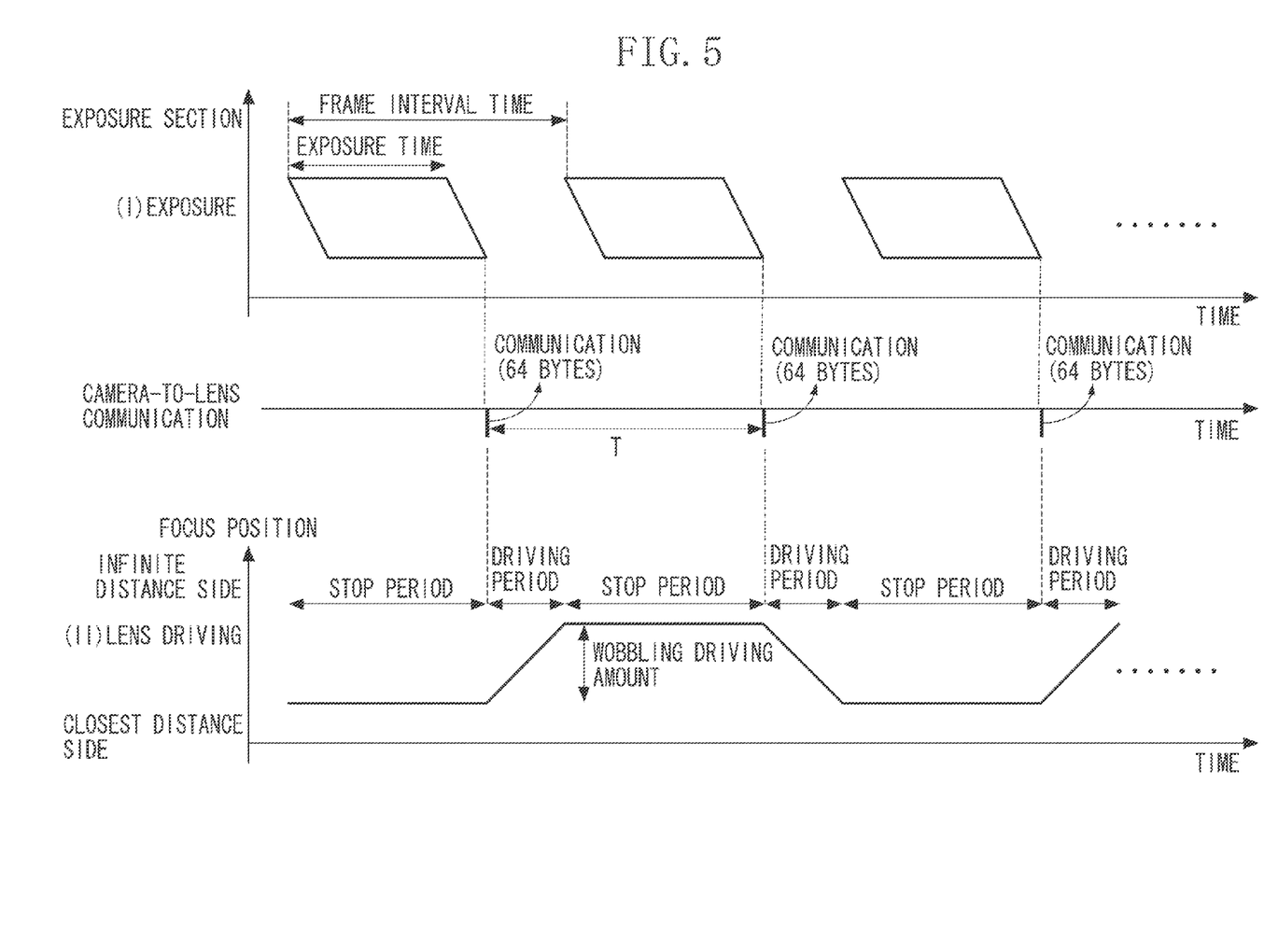
FIG. 5 illustrates communication timing in performing a wobbling operation.

FIG. 5 illustrates a timing of communication performed when the focus lens 2 performs the wobbling operation and a timing of driving of the focus lens 2. The camera microcomputer 11 starts communication for transmitting data relating to focus lens driving control to the lens microcomputer 5 immediately after exposure of the image sensor 10 ends. In the present exemplary embodiment, 64-byte data having a fixed length is communicated. An example of the data to be communicated, a value representing a communication command is stored in the first byte of the data. A driving period is stored in the second byte of the data. The lens microcomputer 5 is required to finish driving wobbling in a period represented by information relating to the driving period. Accordingly, the driving period of the focus lens 2 in FIG. 5 is determined according to a content of the communication.

Various types of information relating to focus lens driving and diaphragm driving are included in the third byte to 62-th byte of the data. Switching information for switching between a still image capturing mode and a moving image capturing mode is stored in the 63-th byte of the data. A check sum for detecting an error is stored in the 64-th byte of the data. The lens microcomputer 5 moves, when it receives the data, the focus lens 2 by an amount of the driving of wobbling in one direction within the driving period, to stop. The data to be received from the camera microcomputer 11 includes the information relating to the driving period of the focus lens 2, as described above.

Figure 6:
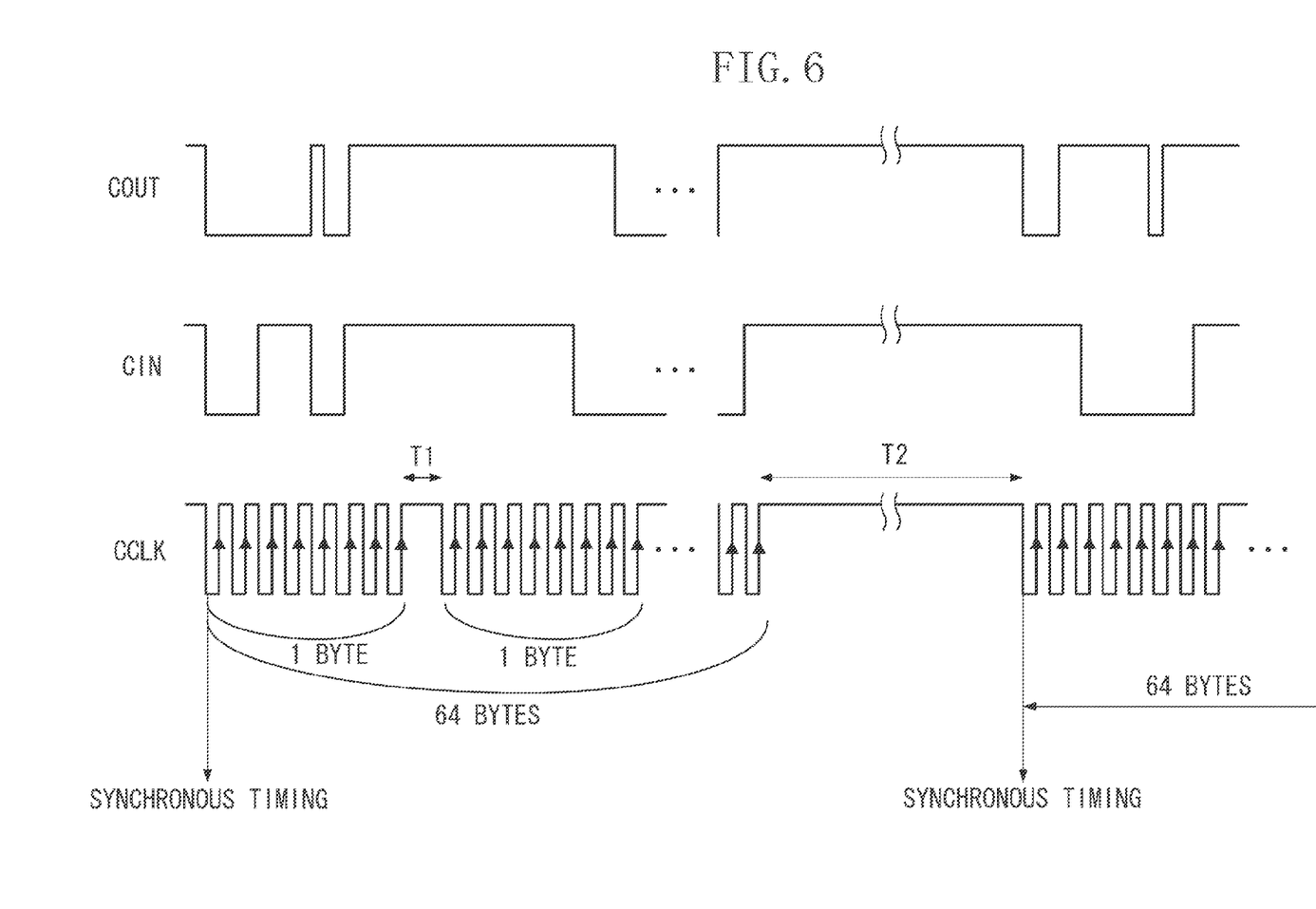
FIG. 6 illustrates a communication waveform in performing a wobbling operation.

A mechanism for synchronizing communication sent at the end of exposure by the camera microcomputer 11 with driving of wobbling will be described with reference to FIG. 6. FIG. 6 is a waveform diagram illustrating signals at the communication terminals Cout, Cin, and Cclk.

The camera signal processing circuit 14 generates a vertical synchronizing signal that is synchronized with a timing of exposure of the image sensor 10, and outputs the generated vertical synchronizing signal to the camera microcomputer 11. The camera microcomputer 11 outputs a clock signal from the communication terminal Cclk based on the vertical synchronizing signal. Every time the exposure of the image sensor 10 ends, communication from the camera microcomputer 11 to the lens microcomputer 5 is performed. The lens microcomputer 5 takes in data from the camera microcomputer 11 into an internal register when a signal level at the communication terminal Cclk serving as the synchronous clock input/output terminal is changed from a low level (Lo) to a high level (Hi).

Such exchange is repeated a total of eight times (by eight bits), so that the camera microcomputer 11 and the lens microcomputer 5 store data corresponding to eight bits as 1-byte data and use the data for internal processing. Further, the exchange is repeated, so that the camera microcomputer 11 and the lens microcomputer 5 perform continuous communication of data of a total of 64 bytes.

When this continuous communication is completed, the camera microcomputer 11 keeps the signal level at the communication terminal Cclk Hi, and lowers the signal level at the communication terminal Cclk from Hi to Lo when the communication is started again at the subsequent exposure end timing. The lens microcomputer 5 monitors the signal level at the communication terminal Cclk (Lclk), and treats a timing, at which the signal level at the communication terminal Cclk (Lclk) is lowered from Hi to Lo after a predetermined time T has elapsed since the signal level at the communication terminal Cclk (Lclk) reached Hi, as a timing synchronous with exposure of the camera. The lens microcontroller 5 controls driving and stop operations of the focus lens 2 based on the synchronous timing and data relating to a driving period, which has been received from the camera microcomputer 11. When the signal level at the communication terminal Cclk (Lclk) is then switched from Lo to Hi, the lens microcomputer 5 takes in data, which the camera microcomputer 11 has sent via the communication terminal Cout, into the internal register, and performs continuous communication of data of a total of 64 bytes, similarly to the previous communication.

The predetermined time T is a time sufficiently longer than a time T1 during which the signal level at the communication terminal Cclk reaches Hi between communication corresponding to one byte and communication corresponding to the subsequent one byte during 64-byte continuous communication. T2 is time elapsed since 64-byte continuous communication ended until the subsequent continuous communication starts. The predetermined time T is set shorter than a time T2. More specifically, T1<T<T2. While the focus lens 2 is stopped from the start to the end of frame exposure in the present embodiment, the present invention is not limited to this. The focus lens 2 may be stopped at a timing of acquisition of an AF evaluation value.

Figure 4:
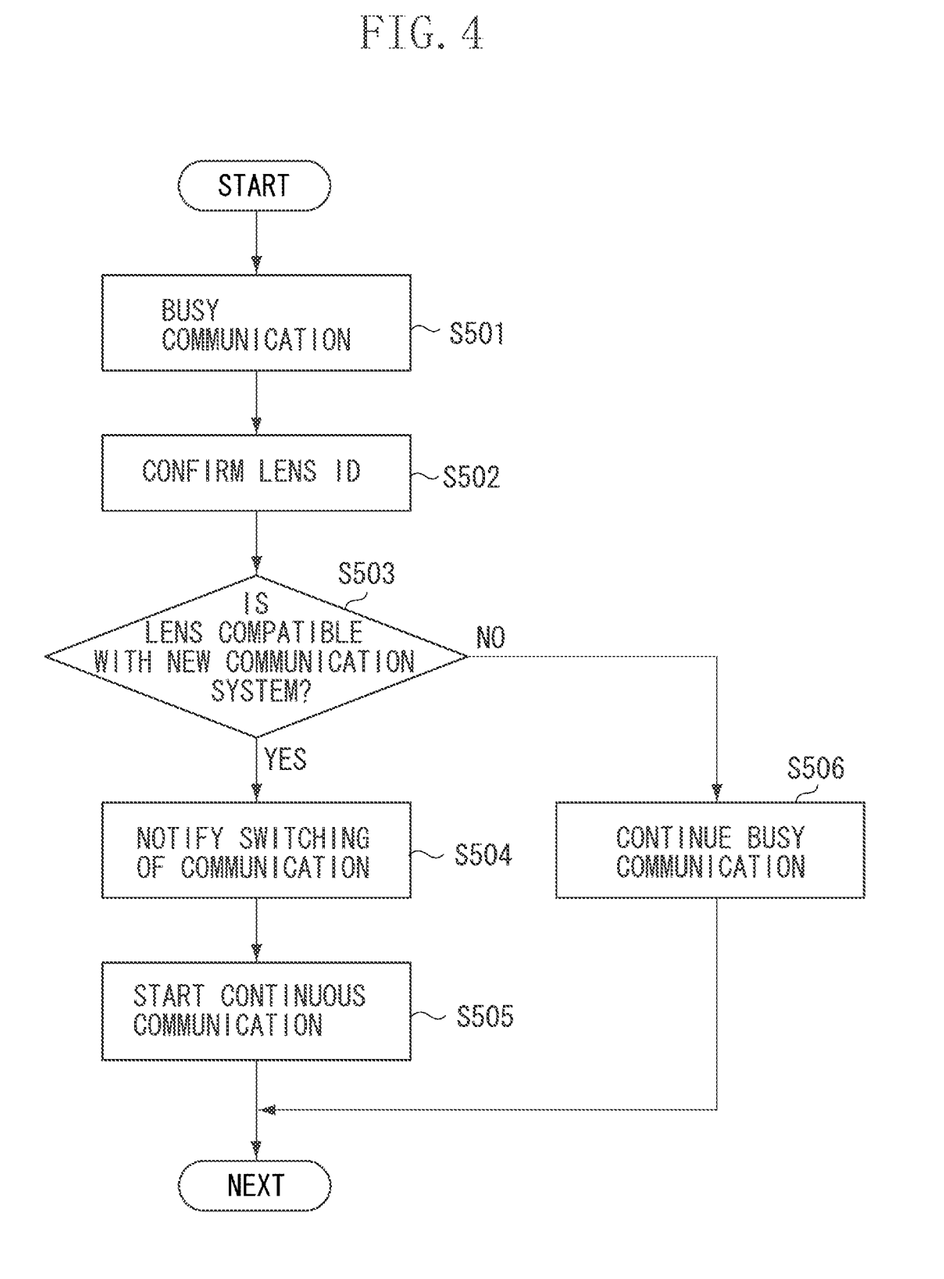
FIG. 4 is a flowchart illustrating initial communication.

Initial communication performed when the interchangeable lens 1 is mounted will be described. A setting operation performed when the interchangeable lens 1 is mounted on the camera according to the present invention will be described below. FIG. 4 is a flowchart illustrating a setting operation relating to communication of a camera system including the camera according to the present exemplary embodiment and the interchangeable lens 1.

When the interchangeable lens 1 is mounted on the camera, the processing proceeds to step S501. In step S501, initial communication is performed using Busy communication between the camera microcomputer 11 and the lens microcomputer 5.

Figure 3:
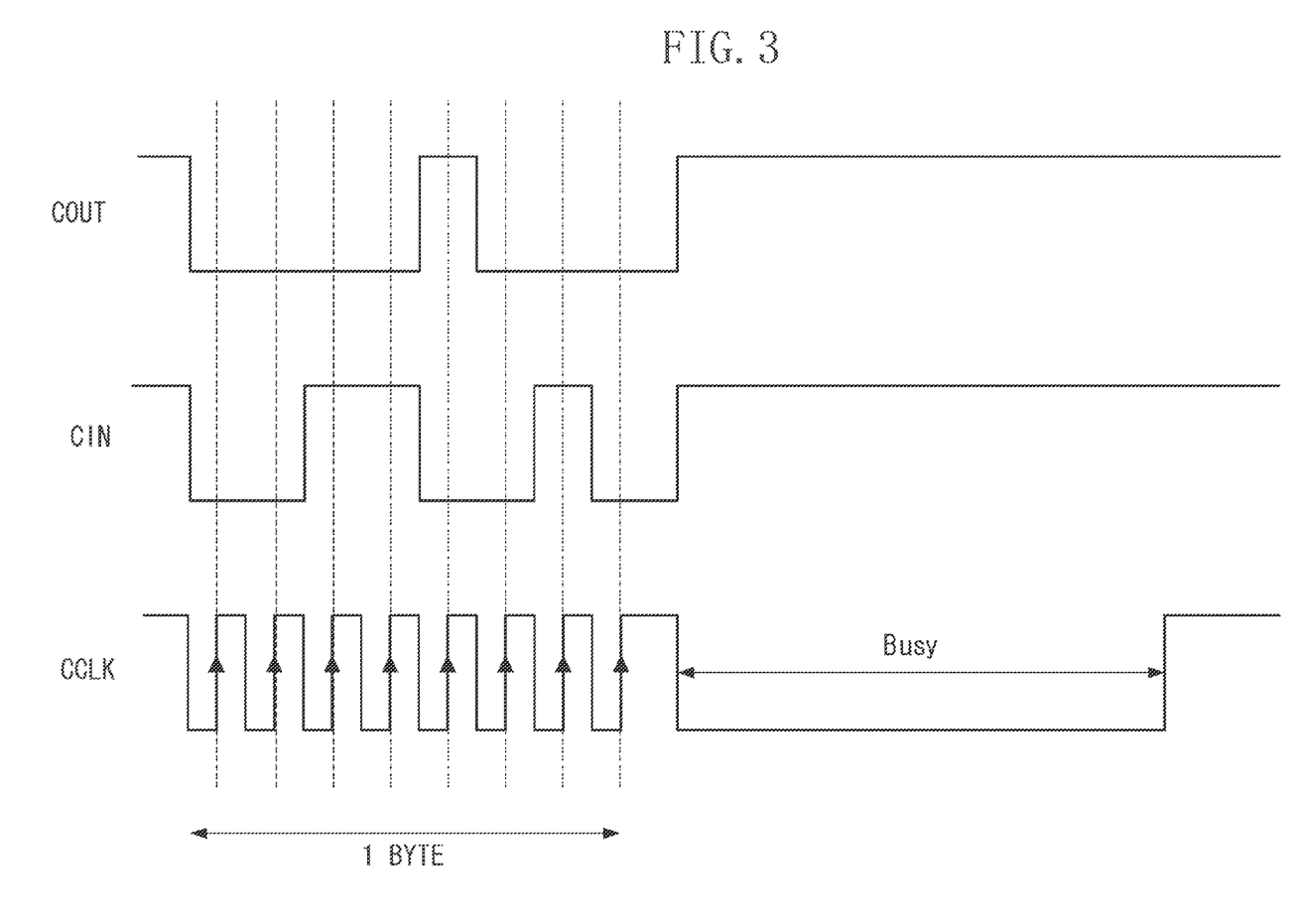
FIG. 3 illustrates a communication waveform in Busy communication.

The Busy communication will be described. FIG. 3 is a waveform diagram illustrating signals at the communication terminals Cout, Cin, and Cclk in the Busy communication.

The camera microcomputer 11 sends data to the lens microcomputer 5 via the communication terminal Cout in synchronization with a rising of a clock signal from the communication terminal Cclk. In addition, the camera microcomputer 11 receives data from the lens microcomputer 5 via the communication terminal Cin in synchronization with the rising of the clock signal from the communication terminal Cclk.

In FIG. 3, a portion where the signal level at the communication terminal Cclk is Lo for a predetermined time represents a Busy state where the lens microcomputer 5 lowers the signal level at the communication terminal Lclk to Lo, to make communication impossible. In the Busy state, the lens microcomputer 5 analyzes data received from the camera microcomputer 11, and performs processing corresponding to the analyzed data. The lens microcomputer 5 performs, when communication processing ends, processing for returning the signal level at the communication terminal Lclk to Hi. In the present exemplary embodiment, in the Busy communication, the lens microcomputer 5 provides a Busy state every time it performs 1-byte communication.

In step S502, the camera microcomputer 11 acquires a lens identification (ID) from the lens microcomputer 5 by the initial communication.

In step S503, the camera microcomputer 11 determines whether the mounted interchangeable lens 1 is compatible with a new communication system from the lens ID acquired in step S502. If the mounted interchangeable lens 1 is compatible with the new communication system (YES in step S503), the processing proceeds to step S504. If the mounted interchangeable lens 1 is not compatible with the new communication system (NO in step S503), the processing proceeds to step S506. The new communication system is a communication system that treats a change in the signal level at the communication terminal Cclk after a lapse of a predetermined time as timing synchronous with frame exposure, as described above.

In step S504, if the mounted interchangeable lens 1 is compatible with new communication system (YES in step S503) the camera microcomputer 11 notifies the lens microcomputer 5 of switching of communication. Then, the processing proceeds to step S505. In step S505, the camera microcomputer 11 starts 64-byte continuous communication. On the other hand, if the mounted interchangeable lens 1 is not compatible with the new communication system (NO in step S502), the processing proceeds to step S506. In step S506, the camera microcomputer 11 continues the Busy communication.

As described above, according to the present invention, communication for notifying the timing of exposure of the image sensor 10 from the camera microcomputer 11 to the lens microcomputer 5 can be performed without increasing the number of contacts.

While the camera microcomputer 11 notifies the lens microcomputer 5 of the synchronous timing to start the continuous communication every time the exposure to the image sensor 10 ends in the present embodiment, the notification of the synchronous timing is not limited to that performed when the exposure of the image sensor 10 ends. The camera microcomputer 11 may notify the lens microcomputer 5 of the synchronous timing in synchronization with the exposure to the image sensor 10, for example, when the exposure to the image sensor 10 starts.

While the communication system is switched immediately after the camera microcomputer 11 determines that the mounted interchangeable lens 1 is compatible with the new communication system in the initial communication in the present exemplary embodiment, the present invention is not limited to this. Only when the lens microcomputer 5 notifies the camera microcomputer 11 of an ID indicating that communication is actually performed with the new communication system in addition to an ID indicating that the mounted interchangeable lens 1 is compatible with the new communication system, for example, the camera microcomputer 11 may switch the communication system. The camera microcomputer 11 may be notified of an ID indicating that communication is actually performed with the new communication system when a large amount of data, for example, aberration information relating to the lenses, is sent to the camera microcomputer 11 from the lens microcomputer 5.

While the case where the driving of the focus lens serving as an optical member is controlled is described in the present exemplary embodiment, the present invention is not limited to this. The present invention is also applicable to driving of a neutral density (ND) filter for reducing a quantity of light entering lenses and an infrared cut filter.

A second exemplary embodiment will be described. While the lens microcomputer 5 monitors the signal level at the communication terminal Cclk (Lclk), and considers the timing at which the signal level at the communication terminal Cclk (Lclk) is first lowered from Hi to Lo after a predetermined time has elapsed since the signal level at the communication terminal Cclk (Lack) reached Hi as a synchronous timing, the present invention is not limited to this. A timing at which the camera microcomputer 11 outputs a predetermined signal from a communication terminal Cclk in synchronization with exposure after a predetermined time has elapsed since continuous communication ended, and the lens microcomputer 5 detects the signal maybe considered as a synchronous timing. For example, a timing at which a signal level at a communication terminal Cclk (Lclk) is changed immediately after it is continuously changed between Hi and Lo a predetermined number of times after a predetermined time has elapsed since the signal level reached Hi may be a synchronous timing. Thus, the lens microcomputer 5 can be prevented from erroneously detecting a timing at which the signal level at the communication terminal Cclk is changed due to noise or the like as a synchronous timing.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An imaging apparatus to which an accessory is detachably attached, said accessory including an optical member, the imaging apparatus comprising:
   a signal generation unit configured to generate a vertical synchronizing signal and output the vertical synchronizing signal;
   an imaging unit configured to accumulate charges for generating an imaging signal in synchronization with the vertical synchronizing signal;
   a control unit configured to generate a clock signal and control data communication with the accessory based on the clock signal;
   a first terminal for sending the clock signal to the accessory; and
   a second terminal for communicating data with the accessory,
   wherein the control unit is configured to communicate cyclically with the accessory via the second terminal, predetermined bytes of data on predetermined items including data relating to driving control of the optical member, in synchronization with the vertical synchronizing signal, and control driving of the optical member based on timing at which a signal level of the first terminal is changed in association with sending the clock signal corresponding to the vertical synchronizing signal.

2. The imaging apparatus according to claim 1, wherein the control unit is configured to start sending the clock signal having predetermined bytes of data in synchronization with the vertical synchronizing signal.

3. The imaging apparatus according to claim 1, further comprising:
   a focus signal generation unit configured to generate a focus signal using the imaging signal, wherein the control unit is configured to control timing of the driving of the optical member so that the optical member does not move during the charge accumulation of the imaging unit.

4. The imaging apparatus according to claim 1, wherein the optical member includes at least one of a focus lens, a diaphragm, and a neutral density filter.

5. The imaging apparatus according to claim 1, wherein the control unit is configured to control the driving of the optical member in synchronization with the charge accumulation of the imaging unit.

6. The imaging apparatus according to claim 1, wherein the control unit is configured to notify timing at which the vertical synchronizing signal is output using the clock signal via the first terminal by changing the signal level of the first terminal, after the control unit communicates the predetermined bytes of data and subsequently a predetermined time lapses while the signal level is kept at a predetermined level.

7. The imaging apparatus according to claim 6, wherein the predetermined time is longer than a time while the signal level of the first terminal is kept at the predetermined level between communication corresponding to one byte and communication corresponding to the subsequent one byte during the predetermined bytes of data communication.

8. The imaging apparatus according to claim 1, wherein the imaging apparatus does not comprise a further terminal for sending the vertical synchronizing signal separately from the first terminal and the second terminal.

9. The imaging apparatus according to claim 1, wherein the control unit is configured to communicate the predetermined bytes of data in synchronization with the vertical synchronizing signal in a first communication mode, and communicate data out of synchronization with the vertical synchronizing signal in a second communication mode.

10. The imaging apparatus according to claim 9, wherein when the accessory is attached to the imaging apparatus, the control unit is configured to communicate with the accessory in the second communication mode and determines whether or not the accessory is compatible with the first communication mode based on data received from the accessory in the second communication mode.

11. An accessory that is detachably attached to an imaging apparatus, said imaging apparatus including an imaging unit configured to accumulate charges for generating an imaging signal in synchronization with a vertical synchronizing signal and a control unit configured to communicate data with the accessory in synchronization with the vertical synchronizing signal, the accessory comprising:
   an optical member;
   a first accessory terminal for receiving a clock signal from the imaging apparatus;
   a second accessory terminal for communicating data with the imaging apparatus; and
   an accessory control unit configured to control data communication with the imaging apparatus based on the clock signal received via the first accessory terminal and control driving of the optical member based on data received from the imaging apparatus,
   wherein the accessory control unit is configured to communicate cyclically with the imaging apparatus via the second accessory terminal, predetermined bytes of data on predetermined items including data relating to driving control of the optical member, and control driving of the optical member based on timing at which a signal level of the first accessory terminal is changed in association with receiving the clock signal corresponding to the vertical synchronizing signal.

12. The accessory according to claim 11, wherein the accessory control unit is configured to receive data relating to timing of the driving of the optical member with regard to the predetermined bytes of data, and control timing of the driving of the optical member based on the received data.

13. The accessory according to claim 11, wherein the accessory control unit is configured to restrict, when the signal level of the first accessory terminal is changed before a lapse of a predetermined time after communicating the predetermined bytes of data, the driving of the optical member based on the timing of the change.

14. The accessory according to claim 13, wherein the accessory control unit is configured to control driving of the optical member based on timing at which the signal level of the first accessory terminal is changed after the accessory control unit communicates the predetermined bytes of data and subsequently the predetermined time lapses while the signal level is kept at a predetermined level.

15. The accessory according to claim 14, wherein the predetermined time is longer than a time while the signal level of the first accessory terminal is kept at the predetermined level between communication corresponding to one byte and communication corresponding to the subsequent one byte during the predetermined bytes of data communication.

16. The accessory according to claim 11, wherein the imaging apparatus includes a focus signal generation unit configured to generate a focus signal using the imaging signal, and the accessory control unit is configured not to move the optical member during the charge accumulation of the imaging unit.

17. The accessory according to claim 11, wherein the optical member includes at least one of a focus lens, a diaphragm, and a neutral density filter.

18. The accessory according to claim 11, wherein the accessory control unit is configured to control the driving of the optical member in synchronization with the charge accumulation of the imaging unit.

19. The accessory according to claim 11, wherein the accessory does not comprise a further terminal for receiving the vertical synchronizing signal separately from the first accessory terminal and the second accessory terminal.

20. The accessory according to claim 11, wherein the accessory control unit is configured to communicate the predetermined bytes of data in synchronization with the vertical synchronizing signal in a first communication mode, and communicate data out of synchronization with the vertical synchronizing signal in a second communication mode.

21. The accessory according to claim 20, wherein when the accessory is attached to the imaging apparatus, the accessory control unit is configured to communicate with the imaging apparatus in the second communication mode and send data indicating that the accessory is compatible with the first communication mode.

22. A control method of an imaging apparatus including a first terminal and a second terminal, to which an accessory is detachably attached, said accessory including an optical member, the control method comprising:
   a signal generation step of generating a vertical synchronizing signal and outputting the vertical synchronizing signal;
   an imaging step of accumulating charges for generating an imaging signal in synchronization with the vertical synchronizing signal;
   a sending step of sending a clock signal to the accessory via the first terminal; and a data communication step of communicating data with the accessory via the second terminal based on the clock signal, wherein the data communication step is configured to communicate cyclically with the accessory via the second terminal, predetermined bytes of data on predetermined items including data relating to driving control of the optical member, in synchronization with the vertical synchronizing signal, and control driving of the optical member based on timing at which a signal level of the first terminal is changed in association with sending the clock signal corresponding to the vertical synchronizing signal.

23. A non-transitory storage medium which stores a program configured to cause a computer to execute the method for controlling an imaging apparatus set forth in claim 22.

24. A control method of an accessory including an optical member, a first accessory terminal and a second accessory terminal, that is detachably attached to an imaging apparatus, said imaging apparatus including an imaging unit configured to accumulate charges for generating an imaging signal in synchronization with a vertical synchronizing signal and a control unit configured to communicate data with the accessory in synchronization with the vertical synchronizing signal, the control method comprising:

a receiving step of receiving a clock signal from the imaging apparatus via the first accessory terminal;

a data communication step of communicating data with the imaging apparatus via the second accessory terminal based on the clock signal; and a drive controlling step of controlling driving of the optical member based on data received from the imaging apparatus, wherein the data communication step is configured to communicate cyclically with the imaging apparatus via the second accessory terminal, predetermined bytes of data on predetermined items including data relating to driving control of the optical member, and the drive controlling step is configured to control driving of the optical member based on timing at which a signal level of the first accessory terminal is changed in association with receiving the clock signal corresponding to the vertical synchronizing signal.

25. A non-transitory storage medium which stores a program configured to cause a computer to execute the method for controlling an accessory set forth in claim 24.

26. An imaging apparatus to which an accessory is detachably attached, said accessory including an optical member, the imaging apparatus comprising:

a signal processing circuit configured to generate a vertical synchronizing signal and output the vertical synchronizing signal;

an imaging unit configured to accumulate charges for generating an imaging signal in synchronization with the vertical synchronizing signal;

a microcomputer configured to generate a clock signal and control data communication with the accessory based on the clock signal;

a first terminal for sending the clock signal to the accessory; and a second terminal for communicating data with the accessory, wherein the microcomputer is configured to communicate cyclically with the accessory via the second terminal, predetermined bytes of data on predetermined items including data relating to driving control of the optical member, in synchronization with the vertical synchronizing signal, and control driving of the optical member based on timing at which a signal level of the first terminal is changed in association with sending the clock signal corresponding to the vertical synchronizing signal.

27. The imaging apparatus according to claim 26, wherein the microcomputer is configured to start to send the clock signal in synchronization with the vertical synchronizing signal.

28. The imaging apparatus according to claim 26, further comprising:

an automatic focus evaluation value processing circuit configured to generate a focus signal using the imaging signal, wherein the microcomputer is configured to control timing of the driving of the optical member so that the optical member does not move during the charge accumulation of the imaging unit.

29. The imaging apparatus according to claim 26, wherein the optical member includes at least one of a focus lens, a diaphragm, and a neutral density filter.

30. The imaging apparatus according to claim 26, wherein the microcomputer is configured to control the driving of the optical member in synchronization with the charge accumulation of the imaging unit.

31. The imaging apparatus according to claim 26, wherein the microcomputer is configured to notify timing at which the vertical synchronizing signal is output using the clock signal via the first terminal by changing the signal level of the first terminal, after the microcomputer communicates the predetermined bytes of data and subsequently a predetermined time lapses while the signal level is kept at a predetermined level.

32. The imaging apparatus according to claim 31, wherein the predetermined time is longer than a time while the signal level of the first terminal is kept at the predetermined level between communication corresponding to one byte and communication corresponding to the subsequent one byte during the predetermined bytes of data communication.

33. The imaging apparatus according to claim 26, wherein the imaging apparatus does not comprise a further terminal for sending the vertical synchronizing signal separately from the first terminal and the second terminal.

34. The imaging apparatus according to claim 26, wherein the microcomputer is configured to communicate the predetermined bytes of data in synchronization with the vertical synchronizing signal in a first communication mode, and communicate data out of synchronization with the vertical synchronizing signal in a second communication mode.

35. The imaging apparatus according to claim 34, wherein when the accessory is attached to the imaging apparatus, the microcomputer is configured to communicate with the accessory in the second communication mode and determines whether or not the accessory is compatible with the first communication mode based on data received from the accessory in the second communication mode.

36. An accessory that is detachably attached to an imaging apparatus, said imaging apparatus including an imaging unit configured to accumulate charges for generating an imaging signal in synchronization with a vertical synchronizing signal and a microcomputer configured to communicate data with the accessory in synchronization with the vertical synchronizing signal, the accessory comprising:

an optical member;

a first accessory terminal for receiving a clock signal from the imaging apparatus;

a second accessory terminal for communicating data with the imaging apparatus; and an accessory microcomputer configured to control data communication with the imaging apparatus based on the clock signal received via the first accessory terminal and control driving of the optical member based on data received from the imaging apparatus, wherein the accessory microcomputer is configured to communicate cyclically with the imaging apparatus via the second accessory terminal, predetermined bytes of data on predetermined items including data relating to driving control of the optical member, and control driving of the optical member based on timing at which a signal level of the first accessory terminal is changed in association with receiving the clock signal corresponding to the vertical synchronizing signal.

37. The accessory according to claim 36, wherein the accessory microcomputer is configured to receive data relating to timing of the driving of the optical member with regard to the predetermined bytes of data, and control timing of the driving of the optical member based on the received data.

38. The accessory according to claim 36, wherein the accessory microcomputer is configured to restrict, when the signal level of the first accessory terminal is changed before a lapse of a predetermined time after communicating the predetermined bytes of data, the driving of the optical member based on the timing of the change.

39. The accessory according to claim 38, wherein the accessory microcomputer is configured to control driving of the optical member based on timing at which the signal level of the first accessory terminal is changed after the accessory microcomputer communicates the predetermined bytes of data and subsequently the predetermined time lapses while the signal level is kept at a predetermined level.

40. The accessory according to claim 39, wherein the predetermined time is longer than a time while the signal level of the first accessory terminal is kept at the predetermined level between communication corresponding to one byte and communication corresponding to the subsequent one byte during the predetermined bytes of data communication.

41. The accessory according to claim 36, wherein the imaging apparatus includes an automatic focus evaluation value processing circuit to generate a focus signal using the imaging signal, and the accessory microcomputer is configured not to move the optical member during the charge accumulation of the imaging unit.

42. The accessory according to claim 36, wherein the optical member includes at least one of a focus lens, a diaphragm, and a neutral density filter.

43. The accessory according to claim 36, wherein the accessory microcomputer is configured to control the driving of the optical member in synchronization with the charge accumulation of the imaging unit.

44. The accessory according to claim 36, wherein the accessory does not comprise a further terminal for receiving the vertical synchronizing signal separately from the first accessory terminal and the second accessory terminal.

45. The accessory according to claim 36, wherein the accessory microcomputer is configured to communicate the predetermined bytes of data in synchronization with the vertical synchronizing signal in a first communication mode, and communicate data out of synchronization with the vertical synchronizing signal in a second communication mode.

46. The accessory according to claim 45, wherein when the accessory is attached to the imaging apparatus, the accessory microcomputer is configured to communicate with the imaging apparatus in the second communication mode and send data indicating that the accessory is compatible with the first communication mode.

* * * * *